(12) United States Patent
Awadhwal et al.

(10) Patent No.: US 11,544,122 B2
(45) Date of Patent: Jan. 3, 2023

(54) SYSTEMS AND METHODS FOR IDENTIFYING SIMILAR ELECTRONIC CONTENT ITEMS

(71) Applicants: Atlassian Pty Ltd., Sydney (AU); Atlassian Inc., San Francisco, CA (US)

(72) Inventors: Gaurav Awadhwal, Sydney (AU); Addo Wondo, Sydney (AU); Geoff Sims, Sydney (AU); Gyeun Gyun Rho, Auckland (NZ); Ahmed Saad, Sydney (AU); Simon Hugo Robilliard, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 30 days.

(21) Appl. No.: 17/137,189

(22) Filed: Dec. 29, 2020

(65) Prior Publication Data
US 2022/0206881 A1    Jun. 30, 2022

(51) Int. Cl.
*G06F 9/54* (2006.01)
*G06N 20/00* (2019.01)
*G06Q 30/00* (2012.01)

(52) U.S. Cl.
CPC ............ *G06F 9/542* (2013.01); *G06N 20/00* (2019.01); *G06Q 30/016* (2013.01)

(58) Field of Classification Search
CPC ............................... G06F 9/4812; G06F 9/542
USPC ........................................................ 719/318
See application file for complete search history.

(56) References Cited

U.S. PATENT DOCUMENTS

| | | | |
|---|---|---|---|
| 6,526,405 B1 * | 2/2003 | Mannila | G06K 9/62 |
| | | | 707/999.005 |
| 11,061,946 B2 * | 7/2021 | Petroni | G06N 5/022 |
| 11,068,658 B2 * | 7/2021 | Mandt | G06F 40/284 |
| 2016/0170814 A1 * | 6/2016 | Li | G06F 9/542 |
| | | | 719/318 |
| 2020/0334093 A1 * | 10/2020 | Dubey | G06F 11/0778 |
| 2021/0406295 A1 * | 12/2021 | Zhong | G06F 40/279 |
| 2022/0035692 A1 * | 2/2022 | Wang | G06F 11/079 |

* cited by examiner

*Primary Examiner* — Andy Ho
(74) *Attorney, Agent, or Firm* — Brownstein Hyatt Farber Schreck, LLP

(57) ABSTRACT

Systems, methods and non-transitory computer readable media for detecting incidents are disclosed. The method includes receiving a primary issue creation event record for a primary issue, the event record including a description of the primary issue, and encoding the primary issue into a primary vector number based on the description of the primary issue. The method further includes identifying candidate issues and retrieving vector numbers of the identified candidate issues, computing distances between the primary vector number and each of the candidate vector numbers, and determining whether incident criteria is met based on the computed distances. In addition, the method includes determining that an incident has occurred upon determining that the incident criteria is met and generating an alert.

20 Claims, 6 Drawing Sheets

SYSTEMS AND METHODS FOR IDENTIFYING SIMILAR ELECTRONIC CONTENT ITEMS

TECHNICAL FIELD

Aspects of the present disclosure are directed to data processing systems and more specifically to mechanisms for identifying and retrieving electronic content items similar to a given electronic content item.

BACKGROUND

Use of machine learning and artificial intelligence has been in development for a number of years. Common machine learning applications include image recognition and complex filtering operations in which explicit algorithms may be difficult to develop. The techniques and systems described herein are directed to a particular technique for using employing artificial intelligence in order to identify content in a collaborative software application.

SUMMARY

In certain embodiments of the present disclosure,] a computer-implemented method is disclosed. The method includes receiving a primary issue creation event record for a primary issue, the event record including a description of the primary issue, and encoding the primary issue into a primary vector number based on the description of the primary issue. The method further includes identifying candidate issues and retrieving vector numbers of the identified candidate issues, computing distances between the primary vector number and each of the candidate vector numbers, and determining whether incident criteria is met based on the computed distances. In addition, the method includes determining that an incident has occurred upon determining that the incident criteria is met and generating an alert.

In other embodiments of the present disclosure, non-transitory computer readable media storing instructions is disclosed. When the instructions are executed by a processor, they cause the processor to receive a primary issue creation event record for a primary issue. The event record includes a description of the primary issue. When the instructions are executed, the further cause the processor to encode the primary issue into a primary vector number based on the description of the primary issue; identify candidate issues and retrieve vector numbers of the identified candidate issues. In addition, when the instructions are executed, they cause the processor to compute distances between the primary vector number and each of the candidate vector numbers, determine whether an incident criteria is met based on the computed distances, determine that an incident has occurred upon determining that the incident criteria is met, and generate an alert.

In yet another embodiment of the present disclosure, a computer system is disclosed. The computer system includes one or more processors, and memory in communication with the one or more processors. The memory includes instructions to receive a primary issue creation event record for a primary issue. The event record includes a description of the primary issue. The memory further includes instructions to encode the primary issue into a primary vector number based on the description of the primary issue, identify candidate issues, and retrieve vector numbers of the identified candidate issues. In addition, the memory includes instructions to compute distances between the primary vector number and each of the candidate vector numbers, determine whether an incident criteria is met based on the computed distances, determine that an incident has occurred upon determining that the incident criteria is met, and generate an alert.

Figure 1:
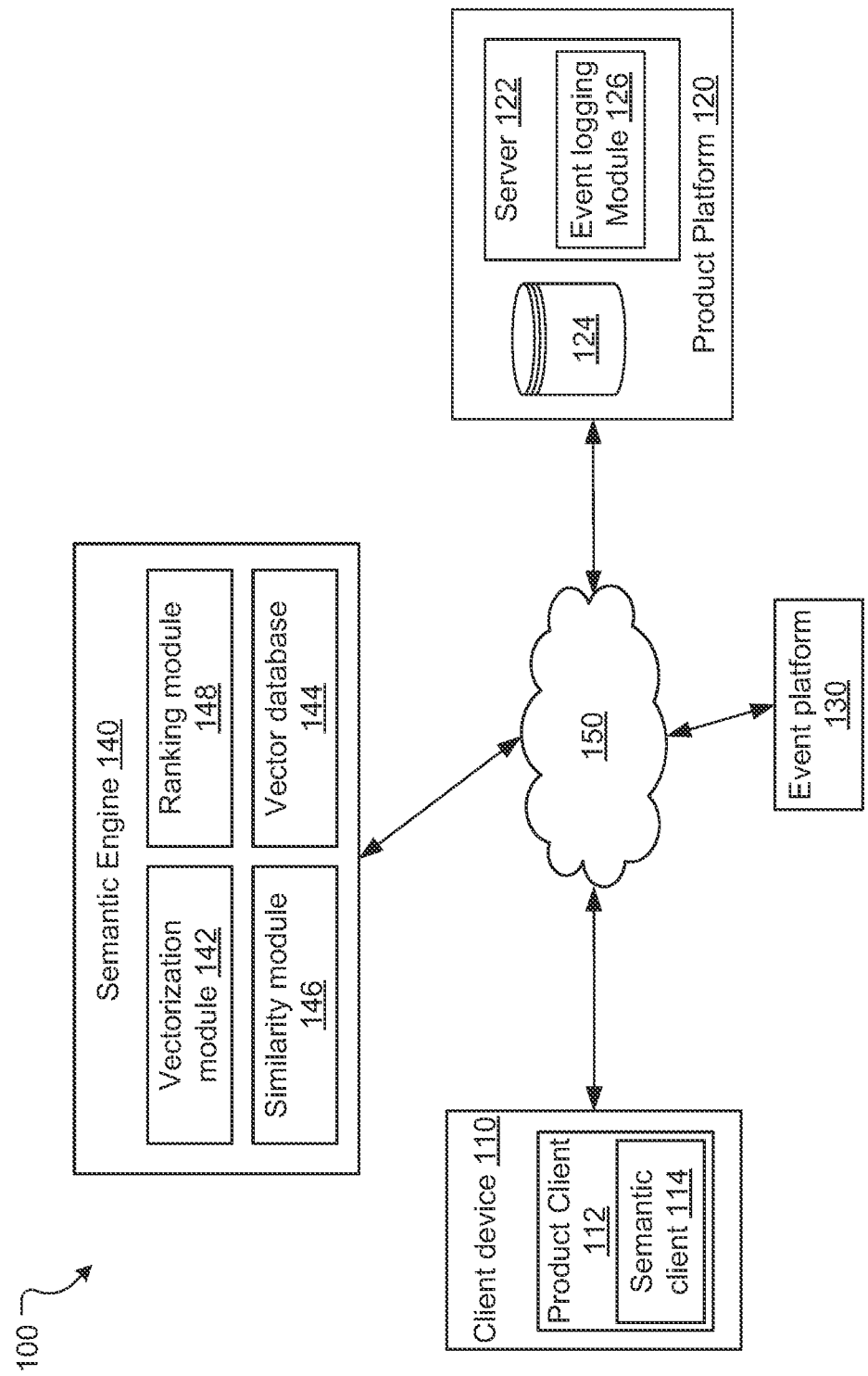
FIG. 1 is a block diagram of a networked environment according to some embodiments of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Overview

Embodiments of the present disclosure are directed to systems and methods that employ machine learning and artificial intelligence to identify semantic similarities in a large number of content items. In particular, the systems and methods described herein analyze plaintext data to infer the semantic meaning of the data and then identify similarities and dissimilarities in the plaintext data to identify content items that have the same meaning. For example, the systems and methods described herein may analyze three sentences—"we are out of toner", "my printer is not working", and "upload button isn't working"—which do not have common words—to infer their semantic meaning and then identify that the first two sentences have a similar meaning whereas the third sentence has a different meaning to the first two.

In some examples, the presently disclosed systems and methods can be utilized in a collaborative software application such as an issue tracking system (ITS). Issue tracking systems are systems that manage the creation and tracking of issues or tickets in a variety of contexts. An issue is an item with associated information (e.g., a title and a brief description) and an associated workflow—i.e. a series of states through which the issue transitions over its lifecycle (e.g., pending, assigned, in process, completed).

As one example, an ITS may be deployed for use by a helpdesk. A busy helpdesk may manage thousands, tens of thousands, or even more issues. Each issue may have a different priority, require different actions, be handled by different people, and/or be handled by multiple different people over its lifecycle. An ITS may be used to assist in managing and tracking this process. When a problem is submitted to the helpdesk, an "issue" is created and assigned (at times with a particular priority). As the issue is worked on by various users, the progress of the issue is recorded and tracked by the issue tracking system until, ideally, the issue is resolved and closed.

In another example, an ITS may be implemented in a software development scenario, in which case issues may be bugs identified in a version of a software application, current features of a software application under development, and/or features intended for further development. An ITS may also be implemented in an organizational administration scenario, in which case issues may be administrative forms (e.g. leave request forms or the like). Many other ITS implementations in which different issues are tracked through different lifecycles are possible. Although the embodiments herein use the term "issues", it will be appreciated that the principles thereof may be applied to different types of content items that have a relatively small amount of plaintext.

In some embodiments, presently disclosed systems and methods may be utilized in an ITS to identify and retrieve issue items that are similar to a currently viewed issue item. Helpdesk staff may review issue items that are similar to a given issue item to check previously implemented solutions. Further, in some examples, when a user is creating a new issue item, the systems and methods disclosed herein may identify previously created/resolved issue items similar to the one currently being created and display these to the user. For example, a developer may be in the process of creating a new issue item to develop a new feature for a software application. The presently disclosed systems and methods may retrieve and display one or more previously created similar issue items while the developer is creating the issue. The developer may view these similar issue items and determine that an issue already exists for the feature the developer wishes to develop and may cancel creation of the new issue item. In this way, duplication of issue items may be prevented.

In another example, the presently disclosed systems and methods may be utilized to identify incidents. An incident is an issue that affects multiple users—e.g., an event that has caused disruption to or a reduction in the quality of service of a software application or service. Incidents can vary widely in severity, ranging from an entire global web service crashing to a small number of users having intermittent errors. Incidents often require an emergency response/solution.

The presently disclosed systems and methods may continuously analyze newly created issues to determine whether there is any semantic similarity in the created issues. If a threshold level of similarly (e.g., 80%) is identified in a predetermined number of newly created issues (e.g., 10 issues), the presently disclosed systems and methods may determine that an incident has occurred and alert one or more ITS support engineers.

It will be appreciated that these are only a few of the applications of the presently disclosed systems and methods in an ITS environment and that aspects of the present disclosure can be used for a number of other such applications as well. For instance, the identified semantic similarity may be utilized to predict and prefetch/preload data for one or more fields of an issue based on data used in such fields in previously created similar issues.

To determine semantic similarity in issues, the disclosed systems and methods utilize word-embedding models that analyze any plaintext associated with an issue, including an issue title, issue description, etc. Word embedding is a language modeling and feature learning technique in natural language processing (NLP) where words or phrases are mapped to vectors of real numbers. Conceptually it involves a mathematical embedding from a space with many dimensions per word to a continuous vector space with much lower dimensions. Generally speaking, an embedding captures some of the semantics of the input words or sentences by placing semantically similar words/sentences close together in an embedding vector space.

Consider the example of an issue. The words in the title or description of an issue can be represented in two ways. In a first way, the words can be represented as a high-dimensional sparse vector in which each cell represents a separate English word, with a million elements to represent a million discrete words. The value in a cell represents the number of times that word appears in the issue title or description. Because a single sentence is unlikely to use more than 20 words, nearly every cell in the vector will contain no value and therefore this type of representation may not be very useful. In a second way, the sentence can be represented as a small but dense vector (e.g., 300 elements) where each element represents a different characteristic of a word and each includes a value between zero and one that indicates the extent to which the word represents that characteristic. In other words, a word is semantically encoded using as many attributes as there are in the vector. This vector is an embedding, which captures the semantic of the issue title/description. The presently disclosed systems and methods utilize this second type of representation.

Using a trained model/encoder for word embedding, the presently disclosed systems and methods analyze and convert the title and/or description of each issue into a vector number. To identify similar issues, distances between vector numbers in the embedded vector space are computed. Issues that have vector numbers that are closer to each other in the embedded vector space are considered similar whereas issues that have vector numbers far apart in the embedded vector space are considered dissimilar. Broadly speaking, when similar issues are requested, the system retrieves a list of issues that have vector numbers within a threshold distance of each other in the embedded vector space and displays these on the user device.

These and other aspects of the present disclosure will be described in detail with reference to FIGS. 1-4 below.

Example System Architecture

FIG. 1 illustrates an environment 100 in which one or more aspects of the present disclosure are implemented. Specifically, FIG. 1 illustrates the various systems involved in identifying and retrieving semantically similar issues to a given primary issue according to embodiments of the present disclosure. The systems include client device 110, a product platform 120, an event platform 130, and a semantic engine 140. The client device 110, product platform 120, event platform 130, and semantic engine 140 communicate with each other over one or more communication networks 150.

The client device 110 may be any suitable device, for example a mobile device (e.g. a tablet or mobile phone), a portable device (such as laptop computer), or any other computing device (e.g. a desktop computer).

As illustrated in FIG. 1, the client device 110 includes a product client 112 configured to access a software application made available by the product platform 120. The client 112 may communicate with the software application hosted by the product platform 120, render user interfaces based on instructions received from the application, and receive inputs from user accounts allowing them to interact with the application hosted by the product platform 120. In certain embodiments, the client 112 renders user interfaces that show one or more issues, allow users to create issues, edit issues, change the status of issues, assign issues to users, etc.

In addition, the client 112 includes a semantic client 114. The semantic client 114 is configured to retrieve context data associated with the user interface rendered on the client device 110 and forward this data to the semantic engine 140 along with a similar issues request. Further, the semantic client 114 is configured to receive a list of issues from the semantic engine 140 and display this list in a suitable user interface on a display of the client device 110.

The client 112 may be implemented in various ways. For example, the client 112 may be a web browser application, which accesses the application hosted by the product platforms 120 via appropriate uniform resource locators (URL) and communicates with the platform via general worldwide-web protocols. In this case, the web browser application is configured to request, render and display user interfaces that conform to a markup language, and may be capable of internally executing browser-executable code, or other forms of code. Alternatively, the client application 112 may be a specific application programmed to communicate with the product platform 120 using defined application programming interface (API) calls. Similarly, the semantic client 114 may be implemented as a web browser widget or as an integration in the application client 112 and may communicate with the semantic engine 140 via defined API calls.

In general, the product platform 120 is a system entity that hosts one or more software applications and/or content. The product platform 120 may include one or more servers 122 for hosting corresponding software application(s) and one or more databases 124 for storing application specific data. Examples of software applications hosted by the product platform 120 include an issue tracking application (e.g., JIRA®, offered by Atlassian, Inc). It will be appreciated that Jira is just an example that the presently disclosed semantic engine 140 can be used with any issue tracking system without departing from the scope of the present disclosure.

In order to run an ITS particular application, the server 122 includes one or more application programs, libraries, APIs, or other software elements that implement the features and functions of the application. In one example, the product server 122 includes an event recording module 126, which monitors user account interactions with the product application hosted by the server 122, and forwards records of each of these user account interactions to the event platform 130 as an event record. The event recording module 126 may be configured to communicate the event records to the event platform 130 either as a continuous stream or in batches periodically.

The product platform 120 also stores product data. Product data generally includes: data defining the operation of the hosted application (for example, user accounts, user permissions, and the like); and application data (i.e., the content hosted/maintained by the application, which can be, for example, issue data. The data is stored on and managed by database 124. Database 124 is provided by a database server which may be hosted by server 122, but is more typically hosted on a separate physical computer in communication (directly or indirectly via one or more networks) with the server 122.

While single server architecture has been described herein, it will be appreciated that the product platform 120 can be implemented using alternative architectures. For example, in certain cases a clustered architecture may be used where multiple server computing instances (or nodes) are instantiated to meet system demand. Conversely, in the case of small enterprises with relatively simple requirements, a product platform 120 may be a stand-alone implementation (i.e., a single computer directly accessed/used by the end user).

The event platform 130 is communicatively coupled to the product platform 120 to receive event records and communicatively coupled to the semantic engine to provide requested event records. In certain embodiments, the event platform 130 is designed based on a publish-subscribe model. That is, the product platform 120 sends event records to the event platform 130 and consumers (such as the semantic engine 140) subscribe to the event platform 130 to receive certain type of event data from the event platform, such as data related to issue creation or issue update events. In this model, the publishers categorize the event data into classes without knowledge of which subscribers there may be. Similarly, subscribers express interest in one or more classes of event data and only receive event data from the event platform 130 that is of interest to them. When the event platform 130 receives an event record, the event platform 130 matches the event record with all the subscribers who are subscribed to the event and makes a copy of the event data for each subscriber and stores a copy to the subscriber's queue or stream. In this case, the product platform 120 may submit event data to the event platform 130 and the semantic engine 140 may subscribe to receive event data related to issue creation and/or issue update. StreamHub® offered by Atlassian, Inc. is one example of such an event platform 130.

The semantic engine 140 is configured to receive issue data from the event platform 130 and generate vector numbers for issues based on the received issue data. In order to do so, the semantic engine 140 includes a vectorization module 142 that includes a sentence encoder that generates the vector numbers based on titles and/or summaries of issues and a vector database 144 that stores the generated vector numbers. In addition, the semantic engine 140 is configured to receive similarity requests from the semantic client 114 and respond to these requests. To this end, the semantic engine 140 includes a similarity module 146, which is configured to retrieve vector numbers from the vector database 144 and compute distances between vector numbers. In addition, a ranking module 148 is provided, which ranks the vector numbers based on the computed distances and provides issue identifiers of a predetermined number of the ranked vectors to the requesting semantic client 114.

Figure 2:
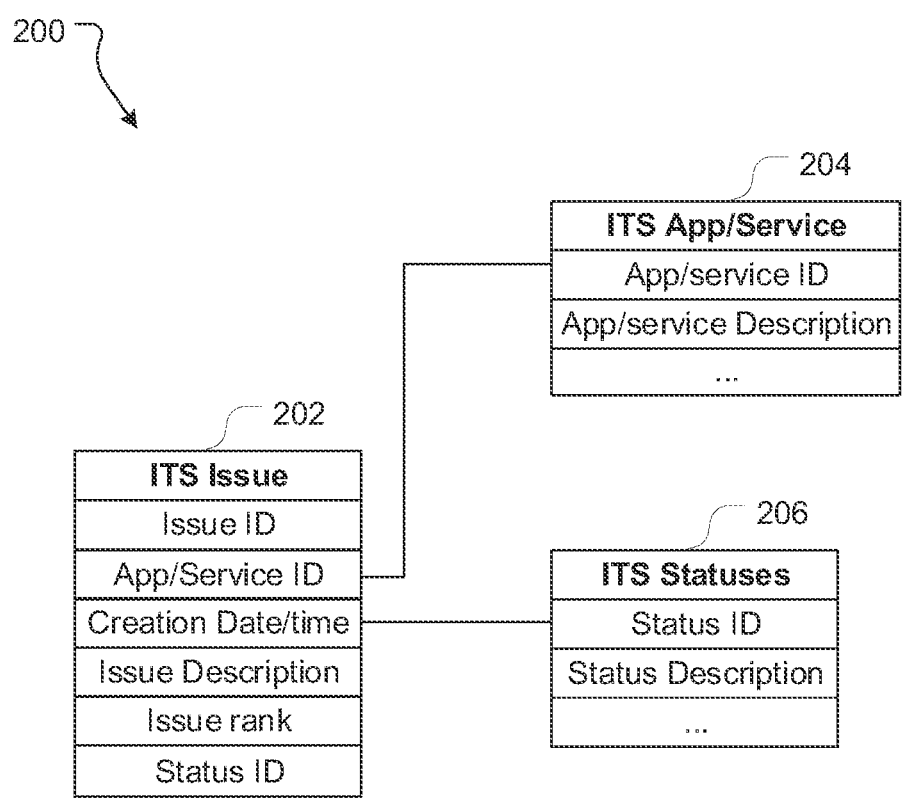
FIG. 2 is a partial example of a simple relational database schema for an ITS.

Functionality of the semantic engine 140 will be described in detail with respect to FIGS. 2-4.

As illustrated in FIG. 1, communications between the client device 110, product platform 120, the event platform 130, and the semantic engine 140 are via the communications network 150. For example, the client device 110 may communicate with the product platform 120 and the semantic engine 140 through a local area network (LAN) or a public network (e.g., the Internet). Furthermore, the product platform 120 may communicate with the event platform 130 over open web protocols.

It will be appreciated that although only one client device 110 and one product platform 120 have been illustrated, in operation, multiple client devices and multiple product platforms may be connected to the semantic engine 140 through the network 150.

General ITS Operation

This section describes the general manner in which an ITS is deployed and used.

ITS maintains metadata defining the operation of the ITS. In one embodiment this metadata includes: one or more issue type definitions, each issue type definition defining a field scheme or field configuration for issues of that type (e.g., the possible fields or data to be maintained by the ITS for issues of a given type); one or more workflow definitions, a workflow definition defining the workflow of an issue of a particular issue type (e.g., the states an issue can take and the manner in which an issue transitions between those states over its lifecycle); and user permissions (e.g., which users have permissions to create issues, view issues, amend issues, change the states of issues etc.).

Further, the ITS maintains a list of tickets received by the ITS. For each ticket in the list, the ITS may be configured to store a wide variety of information. By way of one simple example, a ticket may include an issue type definition which may define the following fields: an application/service field storing an application/service associated with the issue; a key field storing a unique identifier for the issue; a title field storing a title of the issue; a description field storing a description of the issue and actions taken with respect to the issue; a status field indicating the stage the issue is currently at in its lifecycle; an assigned person field indicating who (if anyone) the issue has been assigned to; a severity field storing the severity of the issue (e.g. critical, major, minor, etc.); a priority field storing the priority of the issue at a general level (e.g. very high, high, medium, low, very low); and a rank field storing a rank value in respect of the issue (defining a rank order of the issue relative to other issues). In this example, the priority field and the rank field store different information. A large number of issues may have the same priority (e.g. critical), however only one issue may have a given rank value. The actual fields defined with respect to an issue type will depend on the requirements of a given ITS implementation, and many other fields are possible.

An ITS may maintain this list of issues in a variety of data structures. In one embodiment, issues are stored in a relational database. By way of illustration, FIG. 2 provides a partial example of a simple relational database schema 200 for an ITS. In this example, schema 200 includes: an issue table 202 comprising an issue ID field, an application/service ID field, a timestamp of when the issue was created, a status ID field, an issue description field, and an issue rank field; an application/service table 204 comprising an application/service ID field, and an application/service description; and a status table 206 comprising a status ID field and a status description field.

Schema 200 has been provided for descriptive purposes, however a relational database schema for an ITS is typically considerably more complex and can have additional/different tables with additional/alternative fields and linked in alternative ways. Furthermore, different data structures entirely could, in some cases, be used. For example, issues could be stored in a single table data structure (which may be appropriate for relatively simple ITSs) where the single table stores all relevant issue data. The table below provides an example of a simple single table data structure for storing issues:

TABLE A

Example issue data structure

| Key | App/ Service ID | Description | Status | Priority | Date/ time | ... | ... |
|---|---|---|---|---|---|---|---|

Example Processes

Figure 3:
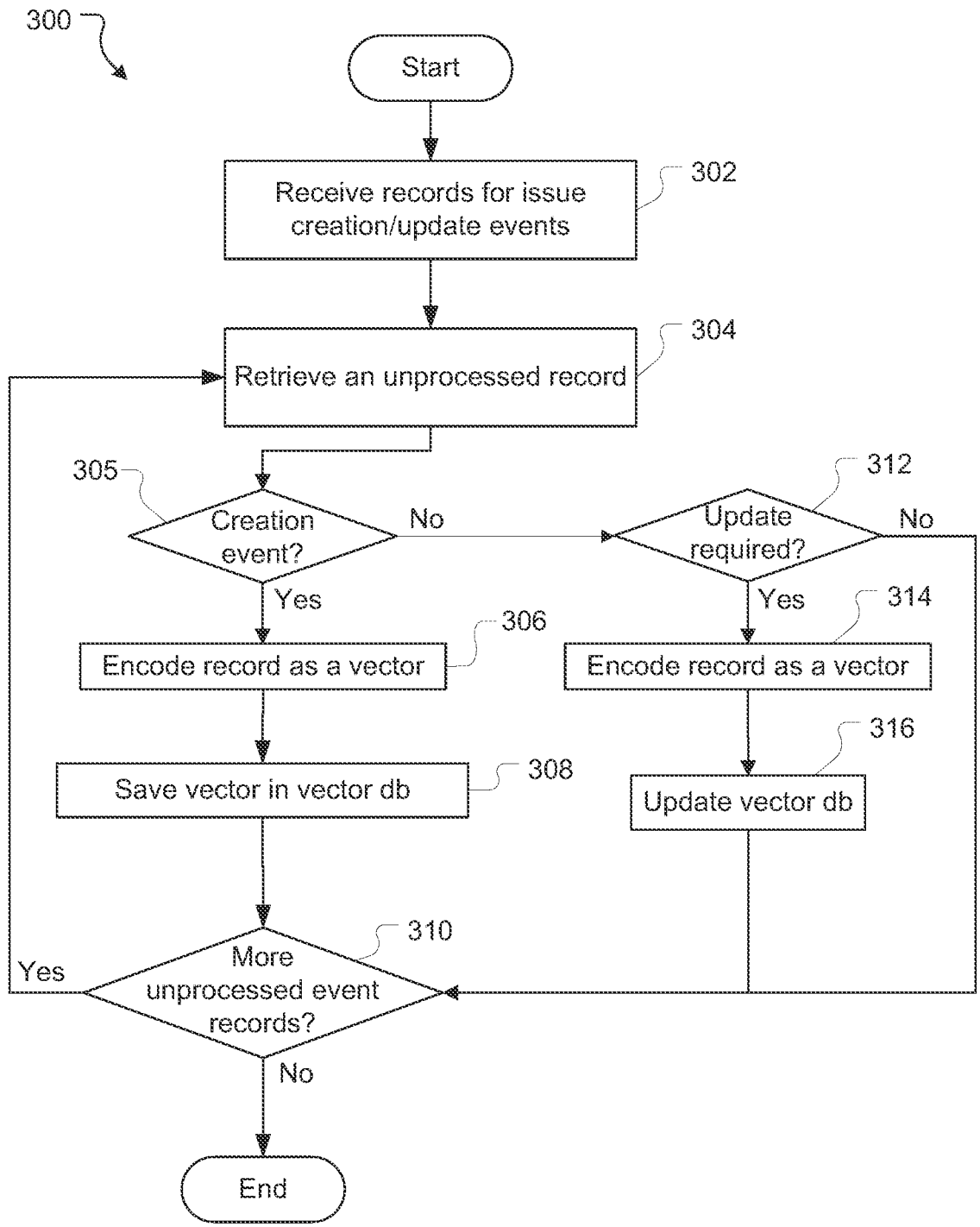
FIG. 3 is a flowchart illustrating a method for generating vectors according to some embodiments of the present disclosure.

FIG. 3 illustrates an example method 300 for generating vector numbers according to some embodiments of the present disclosure. Although method 300 is described with reference to a single generation process, it will be appreciated that in practice this method is repeated periodically to generate vector numbers in a given time period.

As noted previously, users (on their client devices 110 and through an associated user account) interact with an ITS application hosted by the product platform 120. Each time a user account interacts with the product platform 120 an event is generated. As referred to herein, an event is an interaction between a user account and the application hosted by the product platform 120. Examples of events include, without limitation: making a selection via an input control, creating, assigning, approving, and labeling, tagging, or otherwise amending issues in an issue tracking system. This list of example events is non-exhaustive and any other type of interactions with the product platforms (e.g., raising an incident ticket) can also be considered within the scope of the term "event".

When an event is detected, the product platform 120 on which the event occurs generates information in respect of the event (in the form of an event record) and forwards this to the event platform 130. The event platform 130 then checks the event record to determine if the semantic engine 140 has subscribed to the information present in the event record. If the event platform 130 determines that the semantic engine 140 has subscribed to information in the event record, the event platform 130 forwards the record to the semantic engine 140.

In some embodiments, the semantic engine 140 may request the event platform 130 to provide event data whenever an issue is created or updated. Further, for each issue creation or update event, the semantic engine 140 may request the following information—

Product platform identifier—this is a unique identifier of the product platform on which the event was recorded.

Tenant Identifier—this is a unique identifier of the tenant associated with the product platform. In some cases, a particular organization may setup a single tenant and therefore have a single tenant identifier for a particular product platform. In other cases, an organization may setup multiple tenants and therefore have multiple tenant identifiers for a particular product platform.

Issue identifier—this is the unique identifier of the issue.

Container identifier—this is the unique identifier of any hierarchical parent of the issue. In the case of an issue management system, the parent of an issue may be a project, a story, or an epic and therefore the container identifier may be a project identifier, story identifier, or an epic identifier.

Timestamp—this indicates the date/time the event occurred.

Event type indicator—this field indicates the type of activity that generated the event record. Examples include, e.g., a selection event (i.e., an event generated when a user makes a selection via an input control), object creation event (i.e., an event generated when an object is created), object edit event (i.e., an event generated when a user edits an object), an assigning event (i.e., an event generated when a user assigns an object), a mention event (i.e., an event generated when a user mentions another user account in an object), a comment event (i.e., an event generated when a user posts a comment on an object), etc.

Issue title—this is the plaintext title provided for the issue when the issue is created. Issue titles may be any brief sentences that describe the issue—e.g., "printer not working", "cannot access MS Outlook", "cannot access laptop", etc.

Issue description—this is a plaintext brief description of the issue entered by a user when the issue is created. The brief description may provide a little more detail about the issue than the title. For example, it may indicate why the printer is not working, or how many times the user tried to access MS Outlook, or that the user may have forgotten their password and therefore cannot access the laptop.

In addition, if the event is an issue update event, the event descriptor may include a 'fields updated' field that indicates which fields of the issue data were updated in the current issue update event.

In some embodiments, if the semantic engine 140 subscribes only to issue creation events, there may be no need for the event type indicator field and this field may be omitted.

Method 300 begins at step 302, where event data corresponding to a particular time window (e.g., last 10 minutes, last one hour, last 6 hours, last 12 hours, last day, etc.) is received at the semantic engine 140.

The selected time window depends on the manner in which the semantic engine 140 is configured. For example, in some cases the semantic engine 140 may be configured to generate vector numbers once every hour and in other cases the semantic engine 140 may be configured to generate vector numbers once every day. The selected generation frequency may depend on a number of factors such as computation power required for generating the vectors, the available computation power of the semantic engine 140, etc.

The event platform 130 may push event records to the semantic engine 140 either in real time (i.e., whenever an event occurs) or at predetermined intervals (e.g., every 15 minutes, every hour, etc.). In case event records are pushed in real time or at intervals that do not match the generation frequency, the semantic engine 140 receives the event records that were generated during that period and stores these event records until it is time to generate the vector numbers.

In other cases, the semantic engine 140 may pull event records from the event platform 130 in real time, e.g., by utilizing web hooks (programmed into the software applications and tools hosted by the event platform 130) that notify the semantic engine 140 when events are available at the event platform 130 or by requesting the event platform 130 at predetermined intervals (e.g., every minute, every 5 minutes, etc.) to provide event records that were generated in that interval. The semantic engine 140 may store these event records until it is time to generate the vector numbers.

In any case, for the received event records, the semantic engine 140 receives relevant issue data in respect of the event, which may, depending on the implementation, include metadata and/or content. In one example, the event record includes the data fields described previously.

At step 304, an unprocessed event record from the set of event records for that time window is selected.

At step 305, the semantic engine determines whether the selected event record is for an issue creation event. In some embodiments, this determination is made by inspecting the event type field, which can indicate whether the event record corresponds to an issue creation event or an issue update event.

If at step 305, the semantic engine 140 determines that the selected event record is for an issue creation event, the method proceeds to step 306, where the issue title and/or description of the unprocessed event record is retrieved and converted into a vector number. As described previously the vectorization module 142 utilizes word embedding to analyze the issue title and description. Word embedding is a language modeling and feature learning technique in natural language processing (NLP) where words or phrases are mapped to vectors of real numbers. Conceptually it involves a mathematical embedding from a space with many dimensions per word to a continuous vector space with much lower dimensions. Generally speaking, an embedding captures some of the semantics of the input words or sentences by placing semantically similar words/sentences close together in an embedding vector space.

In certain examples, the vectorization module 142 utilizes a universal sentence encoder such as a universal sentence encoder by Google®, made available by TensorFlow. The universal sentence encoder can be based on different models—a transformer based model and a deep averaging network model.

The transformer based sentence encoding model constructs sentence embeddings using an encoding sub-graph of a transformer architecture. The sub-graph uses attention to compute context aware representations of words in a sentence that take into account both the ordering and identity of all the other words. The context aware word representations are converted to a fixed length sentence encoding vector by computing element-wise sum of the representations at each word position.

In the deep averaging network model based encoder, input embeddings for words and bi-grams are first averaged together and then passed through a feedforward deep neural network (DNN) to produce sentence embeddings. The model makes use of a deep network to amplify the small differences in embeddings that might come from just one word like good/bad.

Both these sentence encoders are generated based on training data. In one example, the training data includes millions of sentences from Google pages and news articles. Based on this training data, the models are trained to identify semantic similarities between sentences and generate vectors numbers. The trained sentence encoders can learns relationships and similarities between words/phrases/sentences that occur in similar contexts in the sources that are provided to it. The transformer-based encoder achieves higher accuracy in generating vectors. However, this comes at the cost of computer time and memory usage, which scales dramatically with sentence length. The deep averaging network encoder on the other hand may be less accurate but utilizes less compute time and memory usage than the transformer model.

For encoding issue titles and sentences using any of these encoders, the vectorization module 142 first converts the issue title and/or brief description into lowercase text and tokenizes it. In one embodiment, to tokenize the input text, the vectorization module splits common English contractions. For example, it can tokenize 'don't' into 'do' and 'n't' and 'they'll' into 'they' and ''ll'. Further, the vectorization module 142 may split commas and single quotes off from word, when they are followed by whitespaces and splits off periods that occur at the end of the sentence. In one example, the vectorization module 142 may utilize a tokenizer such as a Penn Treebank (PTB) tokenizer to tokenize the input lowercase text.

Once the issue plaintext is tokenized, it is fed to the sentence encoder, which utilizes either the transformer model or the deep averaging network model to generate a 512 dimensional sentence embedding vector number.

Next, at step 308, the generated vector number is saved in the vector database 144. In one example, the vector number is saved along with the issue identifier, the container identifier and the tenant identifier. Table B shows an example data structure for storing the vectors.

TABLE B example vector database

| Issue identifier | Container identifier | Tennant identifier | Vector number |
| --- | --- | --- | --- |
| Issue 1 | Container 1 | Tenant 1 | < . . . > |
| Issue 2 | Container 1 | Tennant 1 | < . . . > |
| Issue 1 | Container 2 | Tenant 1 | < . . . > |
| Issue 6 | Container 4 | Tenant 2 | < . . . > |

In addition to issue, container and tenant identifiers, for each record, the vector database may also store a version number and a timestamp indicating when the vector was last generated. In Table B, vectors for all tenants, containers and issues are stored together. However, in other examples, different databases/data structures may be maintained for different tenants. In such cases, the table may omit the tenant identifier field and simply store issue identifiers, container identifiers and corresponding vector numbers.

At step 310, the vectorization module 142 determines whether any unprocessed event records exist in the event records retrieved at step 302. If it is determined that one or more unprocessed event records exist, the method returns to step 304. Alternatively, if a determination is made that no unprocessed event records remain, the method 300 ends.

Returning to step 305, if at this step it is determined that the event record is not for an issue creation event but for an issue update event, the semantic engine 140 determines that it is very likely that a vector record for the issue already exists in the vector database (e.g., because it was created when the issue was first created). The method then proceeds to step 312 where the semantic engine 140 determines whether the vector record maintained in the vector database for the given event record needs to be updated.

As described previously, the vectorization module 142 generates vector numbers based on the title and/or description of the issue. Accordingly, at step 312, the semantic engine 140 may determine whether the title and/or description of the issue has been updated in the present event record. If the title and/or description has been updated, updating the vector record may be warranted as the amended title/description may result in a different vector number. However, if the title/description has not been updated, updating the vector may not be warranted. In one example, the semantic engine may determine that the title and/or description has been updated by inspecting the 'fields updated' field in the event record.

If at step 312 a determination is made that update is not required (e.g., because the title/description were not updated), the method directly proceeds to step 310. Alternatively, if at step 312 a determination is made that update is required (e.g., because the title/description were updated), the method proceeds to step 314, where the record is encoded as a vector. This is similar to step 306 and therefore is not described in detail again.

At step 316, the corresponding vector record for the selected event is updated based on the vector number generated at step 314. If the vector database also stores a timestamp for each vector, the timestamp is also updated to indicate when the vector record was updated.

Method 300 is described where vectors are calculated periodically, in a batched fashion. In other embodiments, the vectors may be generated in a streaming fashion—i.e., in real time as events are generated and/or received at the semantic engine 140. For encoding issues into vector numbers in the streaming fashion, a similar method is employed, but instead of receiving a batch of events and then executing steps 304-308 and/or 312-316 for each event record, method steps 304-308 and/or 312-316 are performed as and when event records are received at the semantic engine 140.

Accordingly, using method 300, the vectorization module 142 encodes issues into vector numbers and maintains the vector database 144. This vector database 144 is updated as and when new vector numbers are generated. Furthermore, the vector numbers stored in the vector database 144 can be subsequently analyzed to respond to similarity requests from the semantic client 114. These functions will be described in detail in the following sections.

Figure 4:
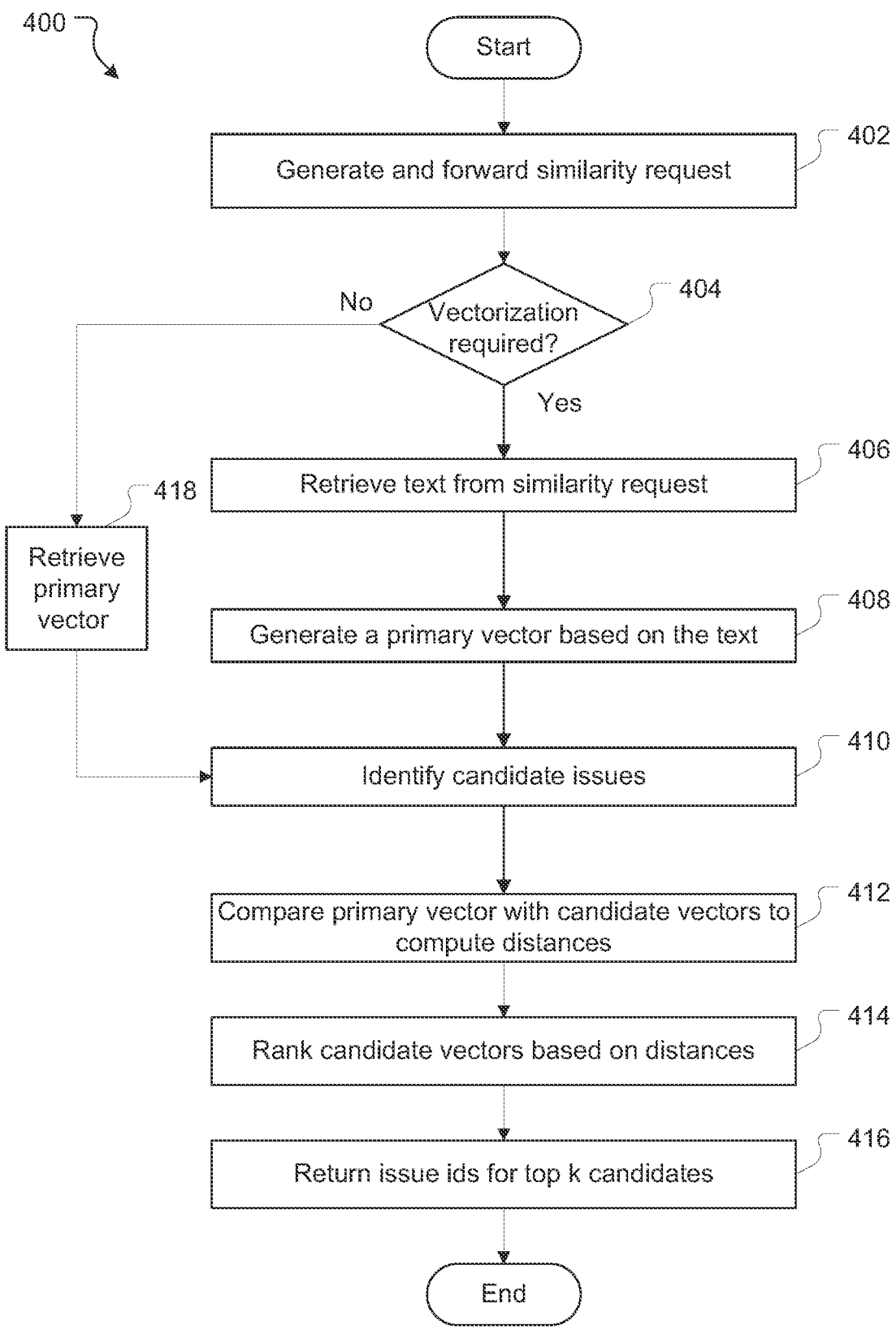
FIG. 4 is a flowchart illustrating an example method for identifying electronic items similar to a primary electronic item according to some embodiments of the present disclosure.

FIG. 4 illustrates an example method 400 for determining similarity between a primary content item and candidate content items according to some embodiments of the present disclosure. This method 400 is described with the example of an ITS where the content items are issues. However, it will be appreciated that this method may be applied to identify similarity between other types of content items are well.

The method begins at step 402, where a client device 110 and in particular the semantic client on the client device 110 generates and forwards a similarity request to the semantic engine 140.

The similarity request may be triggered for many different reasons. In some cases, the semantic client may generate the request automatically without any user intervention. For example, when a user selects a particular issue to view, the semantic client could automatically generate and forward the similarity request to the semantic engine. In another example, a user may be creating a new issue and as soon as the user has finished entering the title and/or the description of the issue, and before the user can confirm creation of the issue, the semantic client may automatically generate and forward the similarity request to the semantic engine.

In other cases, the semantic client 114 may generate the request based on user intervention. For example, a user interface that displays an issue may include a tab or other affordance for checking similar issues. When the semantic client 114 detects a user input on the tab or other affordance, it generates and forwards the similarity request. In another example, a user may be able to select an issue from a list of issues and request to view similar issues. In such cases also, the semantic client 114 generates and forwards the similarity request to the semantic engine 140.

In all cases, the similarity request includes some contextual data. In case the issue for which the similarity request is generated already exists, the similarity request includes the issue identifier, the container identifier and the tenant identifier associated with the issue. In case the issue for which the similarity request is generated does not already exist (e.g., because the user is in the process of creating the issue), the similarity request includes the plaintext issue title and/or issue description (if it is available).

In some examples, the similarity request may also include an instruction indicating the maximum number of similar issues to be received as part of the response. The issue for which the similarity request is created is called a primary issue in the present disclosure.

In some other further examples, the similarity request may also include a similarity request type—that is a field that indicates the type of the similarity request. For example, the similarity request type may indicate that the similarity request is generated to retrieve similar issues to a primary issue being created by a user or the similarity request type may indicate that the similarity request is generated to retrieve similar issues to a primary issue being viewed by the user.

Further still, the contextual data may include information about the primary issue's status (e.g., in case the primary issue has already been created and is currently being viewed).

At step 404, the semantic engine 140 receives the similarity request and determines whether vectorization is required for the primary issue. As vectorization may take place in batches at predetermined times there may be a delay between when an issue is created and its event record is processed by the vectorization module 142. Further, even if issues are vectorized in a streaming fashion, the issue may be scheduled in a queue in the vectorization module 142, which can cause delays between when the issue is created and when it is vectorized. If the similarity request is created in this period, the primary issue may not have been vectorized when the similarity request is received at the semantic engine 140.

To account for this, at step 404, the semantic engine 140 determines whether a vector number already exists for the primary issue. To this end, if an issue identifier is provided as part of the similarity request, the semantic engine 140 may perform a lookup in the vector database 144 using the issue, project and tenant identifiers. It the semantic engine 140 finds a match in the vector database 144 it determines that vectorization is not required as a vector number has already been generated for the primary issue. Alternatively, if it fails to find a match in the vector database 144 for the issue, project and tenant identifier, the semantic engine 140 determines that the primary issue has not yet been vectorized and that vectorization of the primary issue is required.

In cases where the similarity request does not include an issue identifier, but just issue plaintext, the semantic engine 140 determines that vectorization is required without performing any additional checks.

If at step 404, the semantic engine 140 determines that vectorization is required, the method proceeds to step 406 where the semantic engine retrieves the plaintext associated with the issue. If the plaintext is provided as part of the similarity request, this data is retrieved directed from the similarity request. If the plaintext is not provided as part of the similarity request (e.g., in cases where an issue identifier is provided but it is determined that the issue has not yet been vectorized), the semantic engine 140 may retrieve the plaintext for the issue from the product platform 120. To this end, the semantic engine 140 may generate and forward a request for issue title and issue description to the product platform 120 along with the issue, project and tenant identifiers received as part of the similarity request. The product platform 120 in turn may retrieve the issue title and description for the provided issue identifier and communicate this to the semantic engine 140.

At step 408, the primary issue title and description are provided to the vectorization module 142 to encode the plaintext into a vector number. This is similar to step 306 of FIG. 3 and therefore is not described in detail again.

At step 410, the semantic engine and in particular the similarity module 146 identifies candidate content items (or candidate issues, in the described example). A candidate issue is defined as an issue with which the primary is to be compared to determine similarity. Depending on the application, the similarity module 146 can be configured to identify candidate issues based on a set of rules. For example, if the similarity request is generated when a user is creating an issue, the similarity module may be configured to consider all issues in the given project (e.g., based on container identifier) and for the given tenant (e.g., based on tenant identifier) to be candidate issues.

In another case, when looking for similar issues for an issue being viewed by a user, the similarity module 146 may be configured to consider all issues corresponding to the given tenant to be candidate issues (across projects, epics, or stories, irrespective of the container in which the issues reside).

Further, in some examples, candidate issues may be filtered based on one or more additional criteria. For example, the similarity module 146 may be configured to identify candidate issues based on additional issue fields such as issue status (e.g., pending, closed, in progress, etc.), issue tags or labels, issue assignee, last updated date, etc. It will be appreciated that in some embodiments, the similarity module 146 may be configured to tailor the list of candidates on the fly. For example, initially the similarity module 146 may identify all issues associated with a tenant to be candidate issues. However, if the number of candidate issues exceeds a threshold number, the similarity module 146 may be configured to filter the candidate issues based on container identifiers (e.g., by only selecting issues that match the container identifier of the primary issue), or other parameters such as last update date (e.g., by only selecting issues that have been updated during a predetermined time period, such as last 6 months), status of the issue (e.g., by only selecting issues that are currently in progress or only selecting issues that have been resolved), etc.

On the other hand, if the initial list of candidate issues is below the threshold number, no further filtering may be performed. One reason to limit the number of identified candidate issues is computation costs. Determining similarity between the primary issue and each candidate issue is time consuming and computationally expensive. If the list of candidate issues is too large, the semantic engine 140 may not be able to identify similar issues quickly, which can frustrate the user and negatively affect the user's experience.

Another reason to reduce the number of identified candidate issues may be application based. For example, if the similarity request is generated to show an ITS staff similar issues that have previously been solved, it would be pointless to show currently pending issues or issues that have not yet been resolved as these issues will not help the developer in determining a solution to the issue the developer is currently viewing. In such cases, it may be beneficial to remove any issues that have an unresolved/in progress status from the list of candidate issues at step 410. Alternatively, if the similarity request is generated to prevent duplication when a user is creating a new issue, it may be beneficial to include issues from different projects, but restrict the issues based on their status (i.e., only include currently pending issues) or their last update date (i.e., only include issues that have been updated in a predetermined time period). It will be appreciated that these are only a few examples to show that the rules for identifying candidate issues can be configured based on computational constraints and application needs and that there are various different ways one can identify candidate issues without departing from the scope of the present disclosure.

As the vector database 144 does not store additional information about issues such as their current status, last update date, tags/labels, etc., the similarity module 146 may have to communicate with the product platform 120 at step 410 to receive this information (if required). In one example, the similarity module 146 may retrieve the list of all issues available in the vector database 144 for a given tenant and/or container identifier and forward the issue identifiers of the retrieved issues to the product platform 120 to request additional information about the issues as required. Based on the additional information, the similarity module may decide to keep an issue as a candidate issue or discard it.

Once the list of candidate issues is identified, the method proceeds to step 412, where the similarity module 146 computes distances between the vector number for the primary issue and the vector numbers for each of the candidate issues. In some examples, the similarity module may compute Euclidean distances between vector numbers. In other examples, it may compute Cosine distances. The particular technique utilized to compute the vector distances may depend on the computational power available. As Euclidean distances are computationally cheaper to compute, this technique may be preferable where limited computational resources are available.

Table C shows example distances between the primary issue vector and four candidate issue vectors—

TABLE C

Example vector distance calculation

| Primary vector | Candidate vector | Distance |
| --- | --- | --- |
| Primary Vector | Candidate vector 1 | 1.034347 |
| Primary Vector | Candidate vector 2 | 3.4632946 |
| Primary Vector | Candidate vector 3 | 1.3821044 |
| Primary Vector | Candidate vector 4 | 8.9475289 |

Next, at step 414, the candidates are ranked based on their distance from the primary vector. Candidate issues that are closer to the primary issue in the embedded space are ranked higher than the issues that are further away from the primary issue in the embedded space.

Table D illustrates the ranked candidate issues based on the calculated distances.

TABLE D ranked candidate vectors

| Rank | Candidate vector | Distance |
| --- | --- | --- |
| 1 | Candidate vector 1 | 1.034347 |
| 2 | Candidate vector 3 | 1.3821044 |
| 3 | Candidate vector 2 | 3.4632946 |
| 4 | Candidate vector 4 | 8.9475289 |

Next, at step 416, issue identifiers for the top k ranked candidates are forwarded to the semantic client 114. As described previously, in some embodiments, the semantic client 114 may specify the maximum number of candidate issues (e.g., 5). If this is provided, the similarity module 146 provides the top five ranked candidates to the semantic client 114. If no maximum number is specified, the similarity module 146 may provide a default number of the top ranked candidates.

The semantic client 114 may then hydrate the candidate issue identifiers by requesting issue data from the product platform 120 for the given issue identifiers. Alternatively, the semantic engine 140 may hydrate the issue identifiers and provide the hydrated results to the semantic client 114. If the hydration is performed by the semantic client 114, the semantic client can be configured to request for more or less candidate issue information (depending on the user interface it is currently displaying).

Returning to step 404, if at this step a determination is made that vectorization is not required (e.g., because the similarity request includes an issue identifier), the method 400 proceeds to step 418 where the vector number for the primary issue is retrieved from the vector database 144. Thereafter, the method returns to step 410 where candidate issues are identified.

Example Applications

FIG. 4 illustrates an example process for receiving similarity requests and responding to these requests. There may be multiple different applications where this process (with slight modifications) may be utilized. Some examples of these applications have already been described briefly.

One example application is to show similar issues to a user when a user is viewing a particular issue. Depending on the status of the issue the user is currently viewing and/or the relationship of the user with that issue, the similar issues shown via the semantic client 114 may vary. For example, if the user is viewing an open issue and the issue is assigned to the user, the semantic client 114 may display one set of similar issues and display another set of similar issues if the user is viewing a resolved issue and the user is not the creator or assignee of the issue.

Such variance in the set of similar issues can be achieved by adding further contextual information, which can help filter the set of candidate issues with which the primary issue is compared. In one embodiment, the semantic client 114 may be configured to review the status of the issue and the relationship of the viewer with the issue to determine whether any candidate filtering information should be provided along with the similarity request. In another embodiment, the semantic client 114 may be programmed to always provide the issue status and relationship information when forwarding the similarity request. In such cases, the semantic engine 140 may be configured to review this information to determine whether it should be used to filter the candidate issues list or not.

In either embodiment, if the user is the assignee of the primary issue and the primary issue is currently open, the semantic engine 140 may be configured to filter the list of candidate issues to only include resolved issues (for the given tenant and container identifier). Alternatively, if the user is not related to the primary issue and the primary issue is a resolved issue, the semantic engine 140 may be configured to filter the list of candidate issues to only include open issues (for the given tenant and container identifier). The different filtering strategies are provided in order to provide the most useful results to the user based on their predicted requirements. In the first case, by only showing similar resolved issues, the system can help the user identify previously successful solutions to similar issues. In the second case, by showing similar open issues, the system can help the user identify people/teams that are currently working on similar issues and find the current experts within the organization for those types of issues.

Another example application is to show similar issues to a user when a user is creating an issue. In this case, filtering of candidate issues may not be required as the aim of the system to show the similar issues is to prevent duplication.

In addition to these example applications, one other application of method 300 may be to identify incidents. As described previously, incidents affect multiple users and therefore when an incident occurs, there is an uptake in the number of similar issues in a short period of time (as multiple users may be raising issues identifying the same problem).

If the presently disclosed invention is utilized to detect incidents, method 300 (i.e., the method for vectorising issues) is performed in a real-time streaming fashion where issues are received at the semantic engine 140 as soon as they are published to the event platform 130 and are vectorized as soon as they are received at the semantic engine 140.

Figure 5:
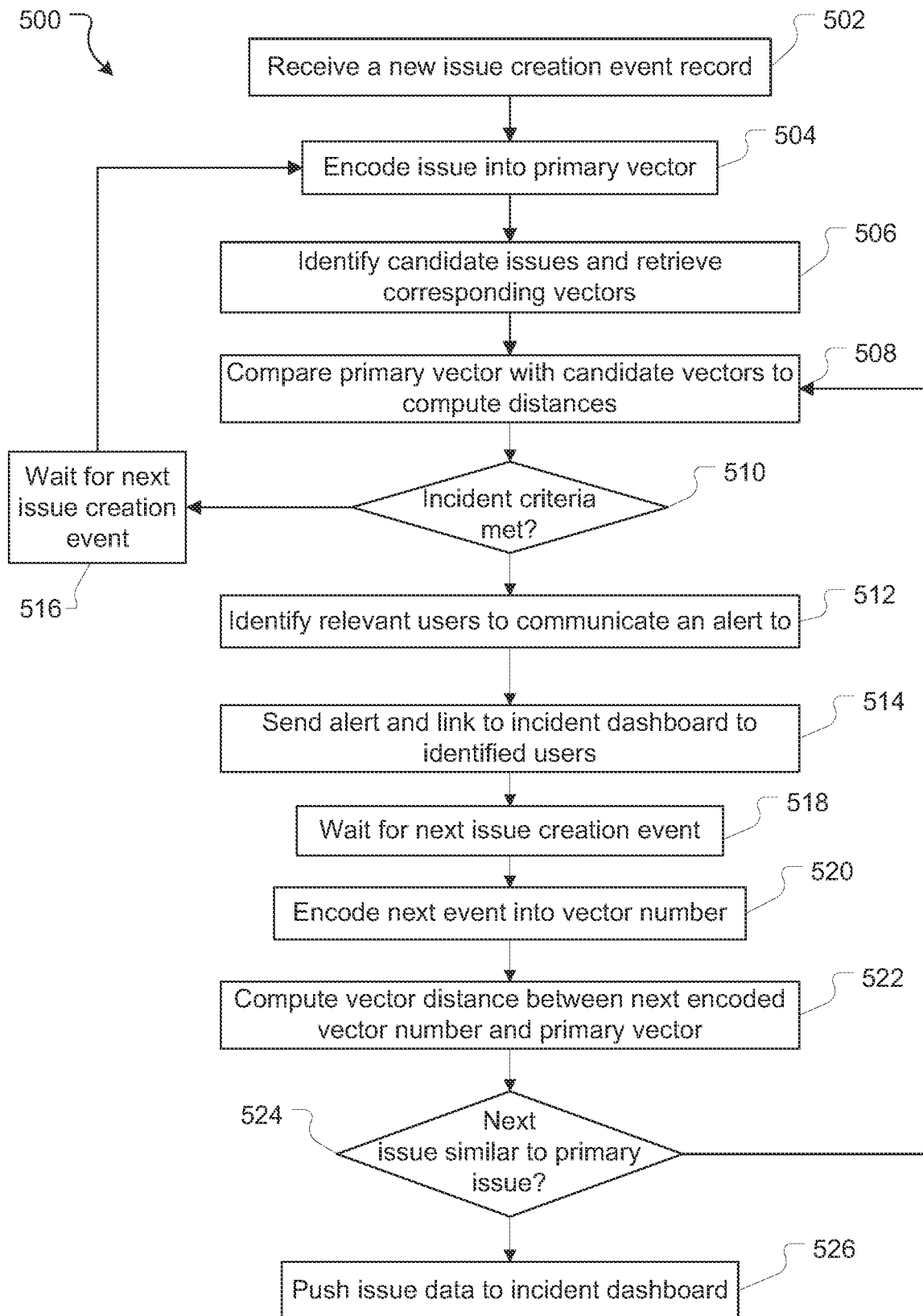
FIG. 5 is a flowchart illustrating an example method for detecting an incident according to some embodiments of the present disclosure.

Further, in this application, a similarity request is not generated by a semantic client 114. FIG. 5 is a flowchart illustrating an example method for detecting incidents according to some embodiments of the present disclosure. The method commences at step 502 where a new issue creation event record is received at the semantic engine 140. The semantic engine 140 is configured to receive event records in a streaming fashion—i.e., as and when the records are detected/received by the event platform 130.

At step 504, the vectorization module 142 retrieves the issue title and/or description for the issue and generates a vector number based on the retrieved data. This process step is similar to step 408 of FIG. 4 and therefore is not described in detail again.

Next, at step 506, the semantic engine 140 identifies candidate issues. In one example, the semantic engine 140 may retrieve all the issues from the vector database 144 that have been vectorized within a predetermined time period (e.g., last 30 minutes). To do this, the semantic engine and in particular the similarity module 146 may inspect the timestamp of each record in the vector database and retrieves the vector numbers and issue identifiers for records that have a timestamp that falls within the predetermined time period.

Once the candidate issues are identified, the method proceeds to step 508 where the similarity module 146 computes distances between the vector number of the issue received at step 502 (called the primary issue) and the vector numbers of the candidate issues. This step is similar to step 412 of FIG. 4 and therefore is not described in detail again.

Once the distances have been computed, the similarity module 146 determines whether an incident criteria is met. In one example, an incident criteria may be met if a threshold number of the candidate issues (e.g., 9 candidate issues) are within a predetermined distance from the primary issue (e.g., if the distance between the primary issue and the candidate issues is less than 0.6).

If at step 510 a determination is made that the incident criteria is met, the method proceeds to step 512 where the semantic engine 140 identifies one or more relevant users to communicate an alert to about the potential incident identified at step 510. In some embodiments, the semantic engine 140 may be communicatively coupled to a database/system that stores and manages a list of helpdesk staff and a real time schedule of the support staff on duty at any given time.

The similarity module 146 may query this database/system to retrieve name/contact information for one or more helpdesk staff that may be currently on duty. In other embodiments, the semantic engine 140 may maintain a preconfigured static list of relevant support staff to contact in case an incident is uncovered. This static list may be configured such that a list of relevant support staff are provided for each of the application/services the ITS is responsible for and for different geographical locations in which the ITS operates. In this case, the relevant support staff may be selected based on the application/service ID associated with a majority of the created issues and/or a geographical location where a majority of the issues were created.

In any case, once one or more relevant users are identified, the similarity module 146 sends an alert to the identified relevant person(s) at step 514. The alert may be sent using a suitable communication mechanism such as an SMS, an email, a push notification, etc. Further, the alert may include a pointer or link to an incident dashboard that shows the issues that were responsible for generating the alert and allows a user to review the issues and confirm whether they correspond to an incident and perform a number of responsive actions if the user confirms that an incident has occurred.

In some embodiments, the incident dashboard may be provided by a dedicated incident management platform, such as OpsGenie, offered by Atlassian Pty Ltd. OpsGenie is a modern incident management platform that ensures critical incidents are never missed, and actions are taken by the right people in the shortest possible time. In case such an incident management platform is available and communicatively coupled to the semantic engine 140, once the similarity module 146 determines that a potential incident has occurred, it may communicate the alert to the incident management platform. As part of the alert, the similarity module 146, may communicate data including, the time at which the incident was detected, the threshold criteria that triggered the alert, an identifier for the alert, identifier for a potential product/service affected, etc. The incident management platform in turn may categorize the alert based on importance and timing which can be determined based on the data received as part of the alert or retrieved from the product platform 120. The incident management platform maintains its own database of on-call schedules of support staff and identifies the relevant people to communicate the alert to. In certain embodiments, the incident management platform may also identify the responsible team for the alert based on the product/application identifier received as part of the alert data from the similarity module 146. Accordingly, in this embodiment, steps 512 and 514 are performed by the incident management platform and not by the semantic engine 140.

If at step 510 a determination is made that incident threshold criteria is not met, the method proceeds to step 516 where the semantic engine 140 waits until the next issue creation event record is received at the semantic engine 140. Upon receiving the next issue creation event record, the method proceeds to step 504. In this manner, the semantic engine 140 may continue to perform method 500 until an incident is detected.

On the other hand, once an incident is detected and the relevant users are alerted, the method may proceed to step 518 where the semantic engine 140 waits for the next issue creation event record to be received.

Upon receiving the next issue creation event record, the method proceeds to step 520 where the new record is vectorized (similar to method step 504). Next, at step 522, the semantic engine 140 may compute a distance between the vector of the issue received at step 518 and the vector of the issue received at step 502.

At step 524, the similarity module 146 determines whether the issue received at step 518 is semantically similar to the primary issue. To this end, it determines if the vector distances between these two issues is below a threshold level. If the vector distances are determined to be below the threshold level, the semantic engine 140 determines that the issue received at step 518 belongs to the same incident that was reported at step 514 and the method proceeds to step 526 where the similarity module 146 may push the additional issue data to the incident dashboard. Thereafter the method proceeds to step 518.

Alternatively, if the vector distances are determined to be above the threshold level, the semantic engine 140 determines that the issue received at step 518 does not belong to the incident that was reported at step 514 and the method proceeds to step 506 (and the issue received at step 518 becomes the primary issue).

This way, the semantic engine 140 does not re-determine whether an incident has occurred or re-compute distances between the next issue (which now becomes the primary issue) and each of the candidate issues (i.e., other issues received in a given time period) each time a new issue is received (once an incident has been detected). Instead, it triggers this computation only when new issues are received that are dissimilar to the issues that caused the incident alert to be generated.

In the above example, the computation is triggered based on the reception of new issue creation event records at the semantic engine. In another embodiment, the computation may be time based—i.e., the semantic engine may perform method steps 506-514 at predetermined time intervals. In this case, there is no primary issue against which the candidate issues are compared. Instead, the similarity module 146 retrieves all the issues from the vector database 144 that were recorded within a predetermined period and compute vector distances between all such issues to determine if a threshold number of issues have vector scores clustered in the embedded space. If it is determined that a threshold number of issues have clustered vector scores, the similarity module 146 determines that an incident has occurred. Otherwise, the method ends and is repeated once the predetermined time interval ends.

Example Computing Device

The operations/techniques described herein are implemented by one or more special-purpose computing systems or devices. For example, in environment 100: the semantic engine 140 may be provided by one or more computer systems; the client device 110 is a computer system; and the product server 122 is provided by one or more computing systems.

The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired and/or program logic to implement relevant operations.

Figure 6:
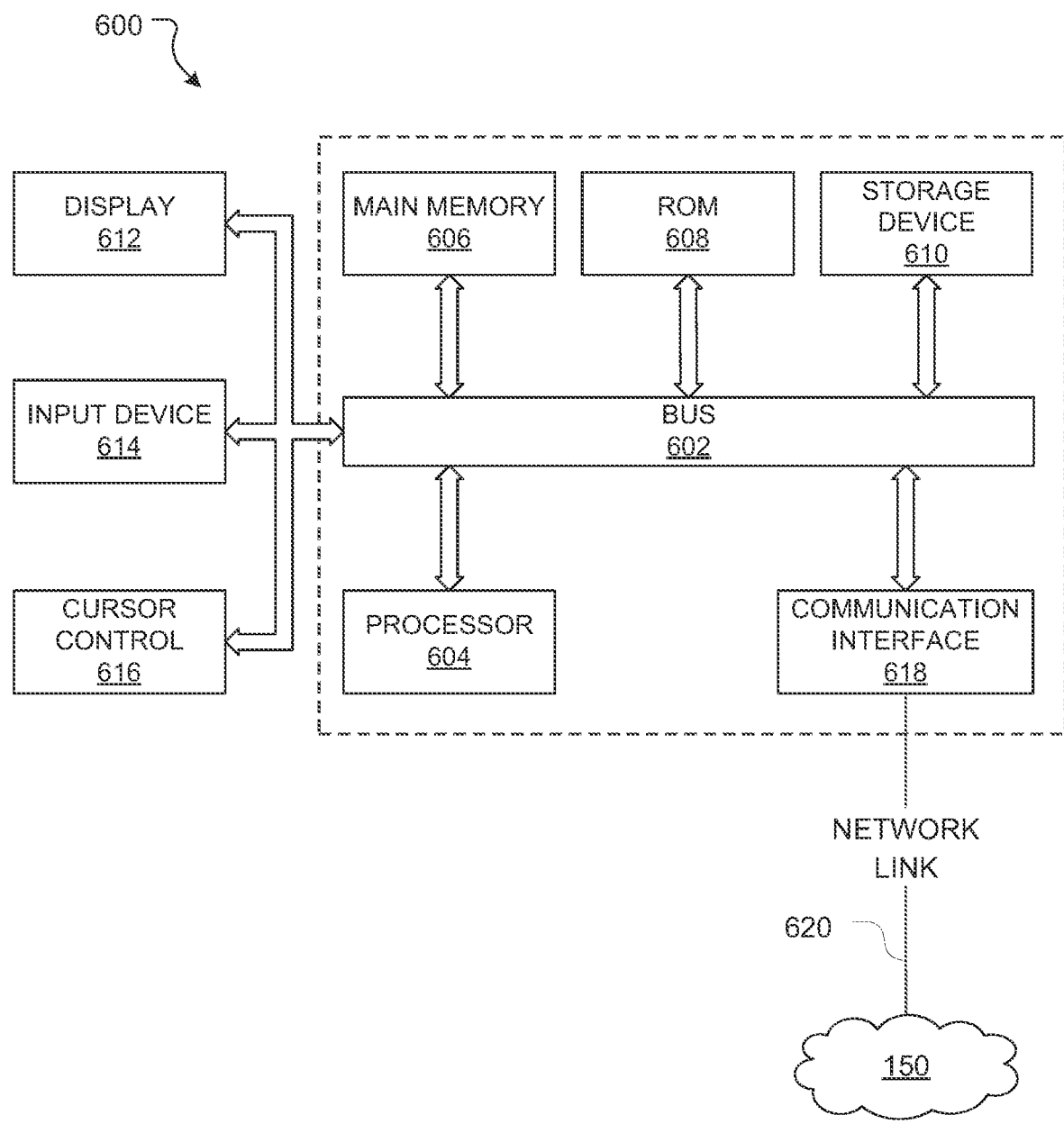
FIG. 6 is a block diagram of a computing system with which various embodiments of the present disclosure may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions. If the computer system 600 is part of the semantic engine 140, the storage device 610 may store the vector database 144.

In case the computer system 600 is the client device 110, it may be coupled via bus 602 to one more output devices such as a display 612 for displaying information to a computer user. Display 612 may, for example, be a cathode ray tube (CRT), a liquid crystal display (LCD), a light emitting diode (LED display), or a touch screen display. An input device 614, including alphanumeric and other keys, may be coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that permits the device to specify positions in a plane. Additional and/or alternative input devices are possible, for example, touch screen displays.

According to one embodiment, the methods disclosed herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory computer readable media that stores data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, hard disk, solid-state drive, magnetic tape, or any other magnetic data storage medium, a CD-ROM, any other optical data storage medium, any physical medium with patterns of holes, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio wave and infrared data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to network 150. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks 150 to other computing systems. For example, if the computer system 600 is part of the semantic engine 140, the network link 620 may provide a connection through network 150 to the event platform 130 or product platforms 120.

Computer system 600 can send messages and receive data, including program code, through the network(s), network link 620 and communication interface 618. In the feature system example, it may receive event data through the network 150 and communication interface 618 from the event platform 130.

The processor 604 of the semantic engine 140 may execute the received event data as it is received, and/or store it in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps. Further, the terms "process" and "method" are interchangeably used.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method, comprising:
    receiving a primary issue creation event record for a primary issue, the primary issue creation event record including a user-supplied description of the primary issue, the user-supplied description including user-supplied textual content;
    encoding the primary issue into a primary vector number based at least in part on the user-supplied textual content;
    identifying candidate issues and retrieving candidate vector numbers of the identified candidate issues;
    computing distances between the primary vector number and each of the candidate vector numbers;
    determining whether an incident criteria is met based on the computed distances; and
    determining that an incident has occurred upon determining that the incident criteria is met and generating an alert.

2. The computer-implemented method of claim 1, further comprising:
    identifying one or more relevant users to communicate the alert to; and
    communicating the alert to the identified relevant users.

3. The computer-implemented method of claim 2, further comprising creating an incident dashboard, and communicating the alert to the identified relevant users comprises communicating a pointer to the incident dashboard.

4. The computer-implemented method of claim 1, wherein the incident criteria is met if a threshold number of the candidate vector numbers are computed to be within a threshold distance of the primary vector number.

5. The computer-implemented method of claim 3 further comprising:
    receiving a second issue creation event record for a second issue, the second issue creation event record including a second user-supplied description of the second issue, the second user-supplied description including second user-supplied textual content;

encoding the second issue into a second vector number based at least in part on the second user-supplied textual content;

computing a distance between the primary vector number and the second vector number;

determining whether the second issue is similar to the primary issue based on the computed distance; and upon determining that the second issue is similar to the primary issue updating the incident dashboard to include information about the second issue.

6. The computer-implemented method of claim 1, further comprising:

receiving a second issue creation event record for a second issue, the second issue creation event record including a second user-supplied description of the second issue, the second user-supplied description including second user-supplied textual content;

encoding the second issue into a second vector number based at least in part on the second user-supplied textual content;

computing a distance between the primary vector number and the second vector number;

determining whether the second issue is similar to the primary issue based on the computed distance;

upon determining that the second issue is not similar to the primary issue, assigning the second issue as the primary issue.

7. The method of claim 1, wherein the primary vector number and the candidate vector numbers are generated using a word embedding model.

8. Non-transitory computer readable media storing instructions, which when executed by a processor cause the processor to perform a method, comprising:

receiving a primary issue creation event record for a primary issue, the primary issue creation event record including a user-supplied description of the primary issue, the user-supplied description including user-supplied textual content;

encoding the primary issue into a primary vector number based at least in part on the user-supplied textual content;

identifying candidate issues and retrieving candidate vector numbers of the identified candidate issues;

computing distances between the primary vector number and each of the candidate vector numbers;

determining whether an incident criteria is met based on the computed distances; and determining that an incident has occurred upon determining that the incident criteria is met and generating an alert.

9. The non-transitory computer readable media of claim 8, further comprising instructions which when performed by the processor cause the processor to:

identify one or more relevant users to communicate the alert to; and communicate the alert to the identified relevant users.

10. The non-transitory computer readable media of claim 9, further comprising instructions which when performed by the processor cause the processor to create an incident dashboard, and communicating the alert to the identified relevant users comprises communicating a pointer to the incident dashboard.

11. The non-transitory computer readable media of claim 8, wherein the incident criteria is met if a threshold number of the candidate vector numbers are computed to be within a threshold distance of the primary vector number.

12. The non-transitory computer readable media of claim 10, further comprising instructions which when performed by the processor cause the processor to:

receive a second issue creation event record for a second issue, the second issue creation event record including a second user-supplied description of the second issue the second user-supplied description including second user-supplied textual content;

encode the second issue into a second vector number based at least in part on the second user-supplied textual content;

compute a distance between the primary vector number and the second vector number;

determine whether the second issue is similar to the primary issue based on the computed distance;

upon determining that the second issue is similar to the primary issue, update the incident dashboard to include information about the second issue.

13. The non-transitory computer readable media of claim 8, further comprising instructions, which when executed by the processor cause the processor to:

receive a second issue creation event record for a second issue, the second issue creation event record including a second user-supplied description of the second issue, the second user-supplied description including second user-supplied textual content;

encode the second issue into a second vector number based at least in part on the second user-supplied textual content;

compute a distance between the primary vector number and the second vector number;

determine whether the second issue is similar to the primary issue based on the computed distance;

upon determining that the second issue is not similar to the primary issue, assign the second issue as the primary issue.

14. The non-transitory computer readable media of claim 8, wherein the primary vector number and the candidate vector numbers are generated using a word-embedding model.

15. A computer system comprising:

one or more processors;

memory in communication with the one or more processors, the memory comprising instructions to:

receive a primary issue creation event record for a primary issue, the primary issue creation event record including a user-supplied description of the primary issue, the user-supplied description including user-supplied textual content;

encode the primary issue into a primary vector number based at least in part on the user-supplied textual content;

identify candidate issues and retrieve candidate vector numbers of the identified candidate issues;

compute distances between the primary vector number and each of the candidate vector numbers;

determine whether an incident criteria is met based on the computed distances; and determine that an incident has occurred upon determining that the incident criteria is met and generate an alert.

16. The computer system of claim 15, wherein the memory further comprising instructions to:

identify one or more relevant users to communicate the alert to; and communicate the alert to the identified relevant users.

17. The computer system of claim 16, wherein the memory further comprising instructions to create an incident dashboard, and communicating the alert to the identified relevant users comprises communicating a pointer to the incident dashboard.

18. The computer system of claim 15, wherein the incident criteria is met if a threshold number of the candidate vector numbers are computed to be within a threshold distance of the primary vector number.

19. The computer system of claim 17 wherein the memory further comprising instructions to:

receive a second issue creation event record for a second issue, the second issue creation event record including a second user-supplied description of the second issue, the second user-supplied description including second user-supplied textual content;

encode the second issue into a second vector number based at least in part on the second user-supplied textual content;

compute a distance between the primary vector number and the second vector number;

determine whether the second issue is similar to the primary issue based on the computed distance;

upon determining that the second issue is similar to the primary issue, update the incident dashboard to include information about the second issue.

20. The computer system of claim 15, wherein the memory further comprising instructions to:

receive a second issue creation event record for a second issue, the second issue creation event record including a second user-supplied description of the second issue, the second user-supplied description including second user-supplied textual content;

encode the second issue into a second vector number based at least in part on the second user-supplied textual content;

compute a distance between the primary vector number and the second vector number;

determine whether the second issue is similar to the primary issue based on the computed distance;

upon determining that the second issue is not similar to the primary issue, assign the second issue as the primary issue.

* * * * *